(12) United States Patent
Baracca et al.

(10) Patent No.: US 12,092,159 B2
(45) Date of Patent: Sep. 17, 2024

(54) BEARING UNIT WITH CONCENTRIC CLAMPING COLLAR

(71) Applicant: AKTIEBOLAGET SKF, Gothenburg (SE)

(72) Inventors: Fausto Baracca, Massa (IT); Andrea A. Bertolini, Carrara (IT)

(73) Assignee: AKTIEBOLAGET SKF (SE)

( * ) Notice: Subject to any disclaimer, the term of this patent is extended or adjusted under 35 U.S.C. 154(b) by 0 days.

(21) Appl. No.: 17/907,415

(22) PCT Filed: Apr. 1, 2021

(86) PCT No.: PCT/EP2021/058728
§ 371 (c)(1),
(2) Date: Sep. 27, 2022

(87) PCT Pub. No.: WO2021/198475
PCT Pub. Date: Oct. 7, 2021

(65) Prior Publication Data
US 2023/0119200 A1 Apr. 20, 2023

(30) Foreign Application Priority Data

Apr. 3, 2020 (IT) .................. 102020000007048

(51) Int. Cl.
F16C 33/64 (2006.01)
F16C 19/06 (2006.01)
(Continued)

(52) U.S. Cl.
CPC .............. F16C 33/64 (2013.01); F16C 19/06 (2013.01); F16C 19/38 (2013.01); F16C 33/586 (2013.01);
(Continued)

(58) Field of Classification Search
CPC .......... F16C 33/64; F16C 19/06; F16C 19/38; F16C 33/586; F16C 35/063;
(Continued)

(56) References Cited

U.S. PATENT DOCUMENTS 3,276,828 A 10/1966 Mansfield
6,146,021 A * 11/2000 Ward .................. F16C 33/64
384/492
(Continued)

FOREIGN PATENT DOCUMENTS

| EP | 0174903 | 3/1986 |
| GB | 696303 | 8/1953 |
| GB | 2520143 | 5/2015 |

OTHER PUBLICATIONS

Search Report for corresponding Italy Patent Application No. 102020000007048 dated Jan. 19, 2021.
Search Report for corresponding European International Patent Application No. PCT/EP2021/058728 dated Apr. 20, 2021.

*Primary Examiner* — Lawrence Averick
(74) *Attorney, Agent, or Firm* — Reed Smith LLP

(57) ABSTRACT

A bearing unit having a stationary radially outer ring, a radially inner ring rotatable about a central rotation axis (X) of the bearing unit is provided with at least one raceway and, in an end portion thereof, with at least two circular sector segments, at least one row of rolling elements interposed between the radially outer ring and the radially inner ring, and a concentric collar for clamping the radially inner ring on a rotating shaft, where an induction-hardening heat treatment is applied to a portion of the radially inner ring that overlaps with at least a portion of the at least one raceway.

5 Claims, 3 Drawing Sheets

(51) Int. Cl.
*F16C 19/38* (2006.01)
*F16C 33/58* (2006.01)
*F16C 35/063* (2006.01)

(52) U.S. Cl.
CPC ........ *F16C 35/063* (2013.01); *F16C 2202/04* (2013.01); *F16C 2204/60* (2013.01); *F16C 2223/18* (2013.01); *F16C 2226/10* (2013.01); *F16C 2240/60* (2013.01)

(58) Field of Classification Search
CPC .............. F16C 2202/04; F16C 2204/60; F16C 2223/18; F16C 2226/10; F16C 2240/60; F16C 2300/02; F16C 2326/01; F16C 23/084; F16C 23/086; F16C 33/6622; F16C 33/7863; F16C 2310/00; F16C 2340/00; F16D 1/0864; Y02P 10/25
See application file for complete search history.

(56) References Cited

U.S. PATENT DOCUMENTS

| | | | |
|---|---|---|---|
| 6,336,748 B2* | 1/2002 | Johnson | F16D 1/0864 |
| | | | 384/537 |
| 6,840,679 B2 | 1/2005 | Lineck et al. | |
| 7,309,375 B2 | 12/2007 | Tornberg | |
| 8,562,767 B2* | 10/2013 | Strandell | C21D 1/10 |
| | | | 148/575 |
| 2001/0010738 A1* | 8/2001 | Johnson | F16D 1/0864 |
| | | | 384/537 |
| 2010/0296764 A1* | 11/2010 | Strandell | C21D 1/10 |
| | | | 148/567 |
| 2014/0144558 A1* | 5/2014 | Burtchen | C21D 1/10 |
| | | | 148/567 |
| 2021/0285497 A1* | 9/2021 | Baracca | F16C 35/063 |

* cited by examiner

BEARING UNIT WITH CONCENTRIC CLAMPING COLLAR

CROSS-REFERENCE TO RELATED APPLICATIONS

This application is a 371 National Stage of International Application No. PCT/EP2021/058728, filed Apr. 1, 2021, which was published as International Publication No. WO 2021/198475, and claims priority to Italian Patent Application No. 102020000007048 filed on Apr. 3, 2020, under 35 U.S.C. § 119, the disclosure of which is incorporated by reference herein.

BACKGROUND

The present disclosure relates generally to bearing units provided with a collar for clamping a radially inner ring of the bearing units on a rotating shaft.

Such bearing units may be suitable for applications in the manufacturing industry, and for the agricultural industry.

BRIEF DESCRIPTION OF THE DRAWINGS

Exemplary embodiments of the present disclosure will be described with reference to the attached drawings, in which.

DETAILED DESCRIPTION

Figure 1:
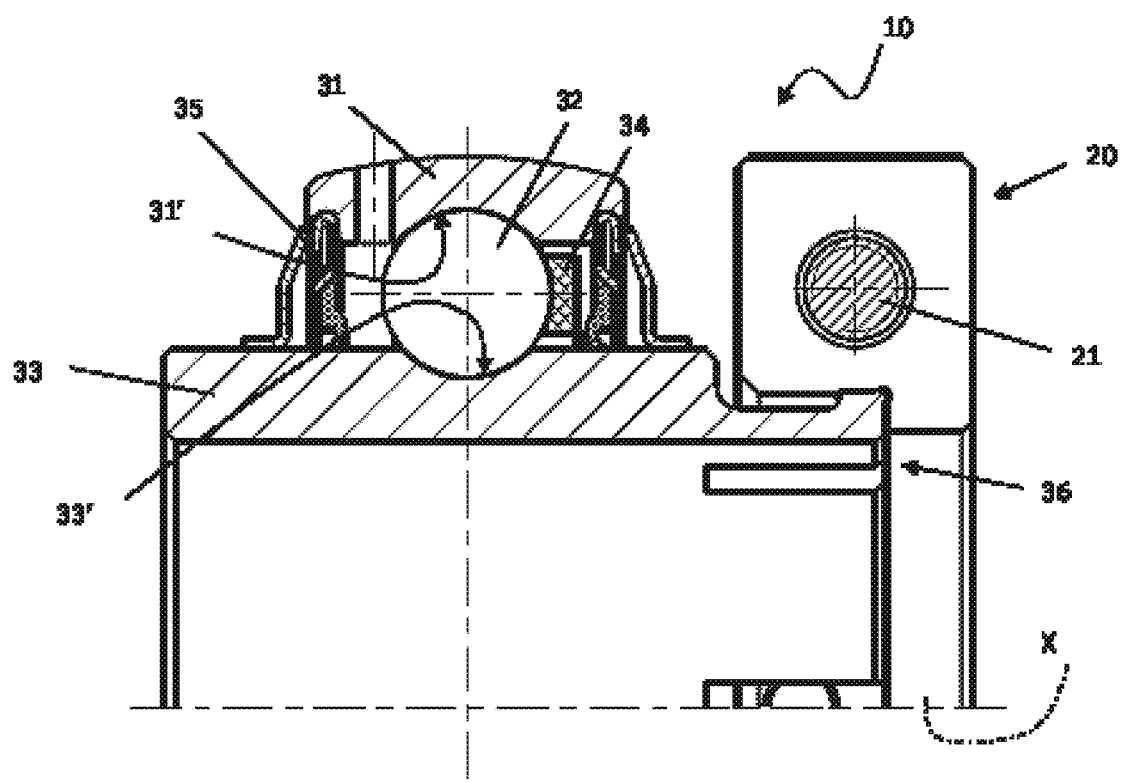
FIG. 1 shows a cross-section of a bearing unit provided with a concentric clamping collar, according to exemplary embodiments of the present disclosure.

Bearing units provided with rolling elements and systems for clamping the said unit on a rotating shaft are known.

Bearing units may be used to allow the relative movement of a component or assembly with respect to another component or assembly. Bearing units generally have a first component, for example a radially inner ring, which is fixed to a first component, for example a rotating shaft, and a second component, for example a radially outer ring, which is fixed to a second component, for example a stationary housing. Typically, the radially inner ring is rotatable, while the radially outer ring is stationary, but in many applications the outer element may rotate and the inner element may be stationary. In any case, in bearing units, the rotation of one ring with respect to the other ring is allowed by a plurality of rolling elements positioned between a cylindrical surface of the first component and a cylindrical surface of the second component, normally called raceways. The rolling elements may be balls, cylindrical or tapered rollers, needle rollers, or similar rolling elements.

Also known are bearing units provided with a clamping collar for mounting on a rotating shaft. Known clamping collars generate excessive noise and vibrations that may result in damage to the shaft on which the bearing unit is installed. Known collars may be shaped at an end portion of the radially inner ring with a plurality of circular sector segments spaced by grooves, namely a series of "grooved fingers" on which the clamping collar engages. The greater flexibility of these circular sector segments facilitates the flexing of the segments against the shaft when the clamping collar is installed and tightened.

Because a thickness of the circular sector segments may not be reduced sufficiently to ensure the necessary flexibility without increasing the risk of excessively weakening the end portion of the radially inner ring, known collars do not sufficiently reduce noise or vibrations.

Furthermore, known radially inner rings are hardened using a case-hardening heat treatment in order to ensure correct operation of the bearing unit. In particular, a hertzian contact between the rings of the bearing unit and the rolling elements (balls, rollers, etc.) requires contact surfaces, which are sufficiently hardened so as to avoid the deformations and consequent vibrations and noise. Case hardening heat treatments, however, reduces the flexibility of the circular sector segments in contact with the clamping collar. Thus, known collars cannot maintain an optimum flexibility while reducing noise and vibrations. This increases a risk that the shaft or radially inner ring may damage.

Therefore, a need exists for a bearing unit provided with a clamping collar such that the clamping action has reliable mechanical strength, ensures concentricity of the shaft and the radially inner ring, does not generate excessive noise and/or vibrations, and is sustainable in economic terms.

An object of the present disclosure is to provide a bearing unit having a clamping collar that achieves a more efficient clamping action and which is therefore not subject to the aforementioned drawbacks.

According to the present disclosure, a radially inner ring may include an end portion that may not contact with a clamping collar having a plurality of circular sector segments spaced apart by grooves. The collar may be configured to establish a concentric and stable fix between the radially inner ring and a rotating shaft.

A radially inner ring consistent with this disclosure may be subject to a localized induction-hardening heat treatment. In this way, a necessary hardness at surfaces of the radially inner ring that contact a plurality of rolling elements of the bearing unit is ensured, while a terminal end of the radially inner ring may be sufficiently pliable. This improves flexibility of portions of the terminal end that are gripped by the concentric clamping collar.

In particular, bearing unit according to the present disclosure is provided with rolling elements and is provided with an optimized clamping system which involves the use of a concentric collar which is able to grip and clamp onto the shaft a plurality of circular sector segments which are spaced by grooves in the radially inner ring, together with an innovative heat treatment for the radially inner ring.

With reference to FIG. 1, a bearing unit 10 may be arranged, for example, between a rotating shaft and a housing element, not shown. Bearing unit 10 may include a stationary radially outer ring 31, a radially inner ring 33, which is rotatable about a central rotation axis X of bearing unit 10, at least one row of a plurality of rolling elements 32, e.g., balls or rollers, interposed between radially outer ring 31 and radially inner ring 33, a cage 34 for containing plurality of rolling elements 32 in position, and a concentric collar 20 for clamping radially inner ring 33 onto the shaft.

Throughout this disclosure and the claims, the terms and the expressions indicating positions and orientations such as "radial" and "axial" are understood as referring to the central rotation axis X of bearing unit 30.

In various embodiments, radially outer ring 31 may be provided with a radially outer raceway 31', and radially inner ring 33 may be provided with at least one radially inner raceway 33' for allowing rolling of row of rolling elements 32 interposed between radially outer ring 31 and radially inner ring 33. For simplicity of illustration, reference number 32 may be attributed both to individual rolling elements of the row of rolling elements and to the row of rolling elements.

In various embodiments, bearing unit 10 may be provided with a seal 35 for sealing off bearing unit 10 from an external environment.

A concentric clamping collar 20 may be included and clamp an end portion 36 of radially inner ring 33 on a rotating shaft (not shown).

Figure 2:
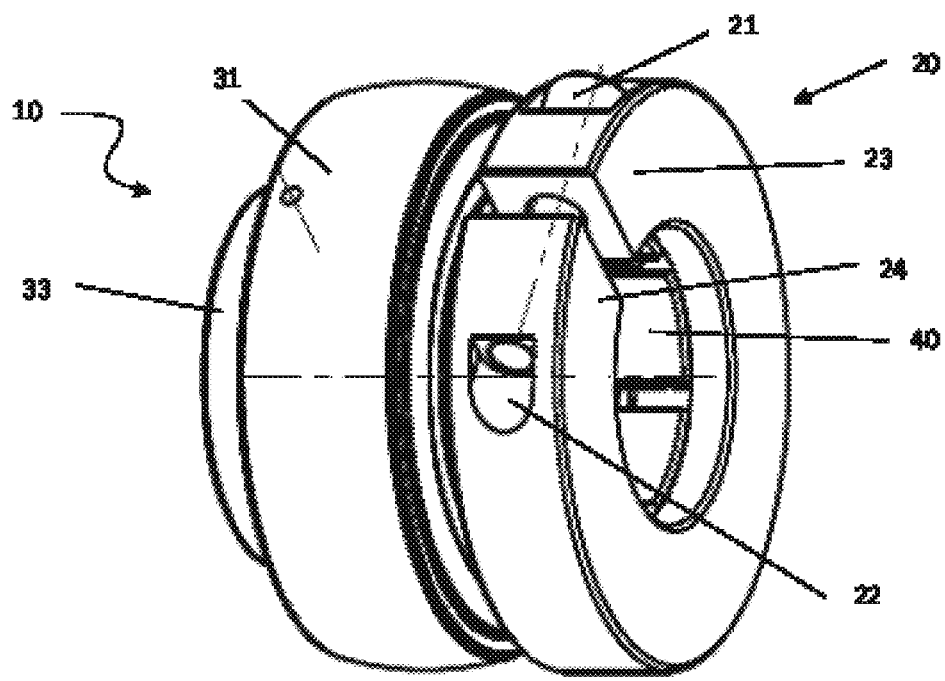
FIG. 2 shows an axonometric view of the bearing unit and collar illustrated in FIG. 1.

As illustrated in FIG. 2, collar 20 may be clamped around circular sector segments 40 of end portion 36 of radially inner ring 33 by a screw 21. In various embodiments, screw 21 may be a cylindrical head screw with a hexagonal socket (e.g. a Torx head screw).

Collar may be provided with a raised groove 22 Collar 20 may be installed over radially inner ring 33 and, in particular, over one or more circular sector segments 40 to lock radially inner ring 33 of bearing unit 10 onto the shaft. Collar 20 may thus be locked in a concentric manner without causing damage and/or burring during installation while exerting a 360 degree clamping force on the shaft with a minimum displacement of one or more arms 23, 24 of collar 20 so as to reduce vibrations experienced during use.

Advantages of locking collar 20 concentrically with the shaft include coincidence between the shaft and axis of symmetry (X) of bearing unit 10 and a reduction of corrosion of collar 20 and inner ring 33 due to friction. Furthermore, a nominal limit of speed and a nominal limit of load of bearing unit 10 do not depend on a tolerance of the shaft, a constant or alternate direction of rotation may be applied during operation/assembly, lower vibration levels do not damage the shaft, and assembly may be fast and easy.

Figure 3:
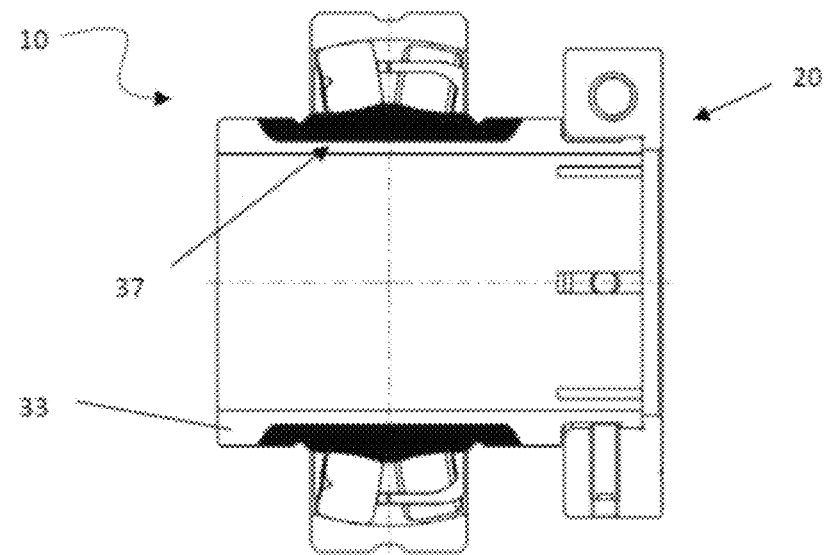
FIG. 3 illustrates a bearing unit having a radially inner ring that is subjected to an induction-hardening heat treatment.

With reference to FIG. 3, a bearing unit 10 may include a portion 37 of a radially inner ring 33 may be subjected to an induction-hardening heat treatment. By using induction-hardening instead of other heat treatments, such as case-hardening, inner ring 33 may be pliable at portion 37 (i.e. in an area near collar 20) and costs of heat treatment is reduced. While an entire surface of radially inner ring 33 is heat treated when using case-hardening heat treatment, discrete portions of inner ring 33, e.g., portion 37, may be subjected to inductions heat-treatment without heat treating other portions of inner ring 33.

With induction-hardening specific surfaces of inner ring 33 may be hardened. In various embodiments, the surfaces surrounding one or more raceways 33' in particular. This different heat treatment may result in a reduction in costs of hardening because less surface area may be treated and a quantity of material treated is less than that of case-hardening and other similar heat treatment processes.

A material of inner ring 33 may be a hardening steel, for example, a 100Cr6 steel, which may also reduce cost.

Figure 4:
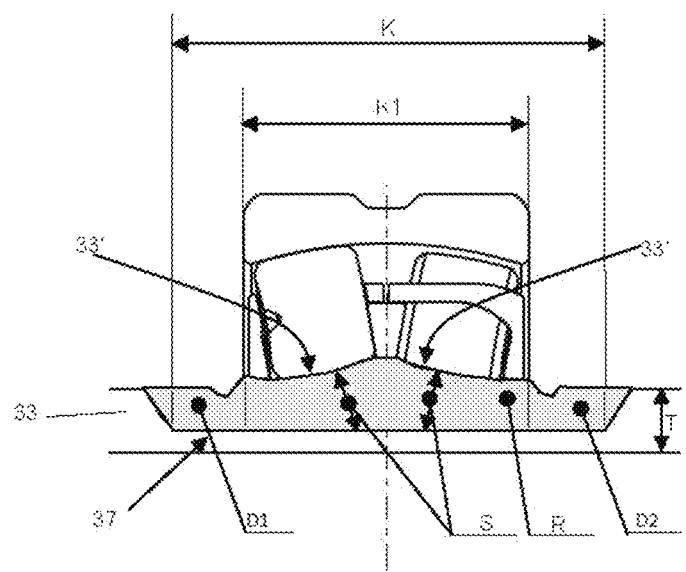
FIG. 4 illustrates a detail view of the radially inner ring of FIG. 3.

With reference to FIG. 4, portion 37 of radially inner ring 33 subjected to induction-hardening heat treatment may be subdivided into a central zone R and peripheral zones D1, D2 situated on opposite sides of central zone R.

In order to optimize induction-hardening heat treatment, an axial length K1 of first zone R may embrace an axial length of raceways 33'. In various embodiments, axial length K1 may be greater than or equal to the axial length of the raceways 33'. Moreover, a hardening depth of zone R, namely the thickness of the material which must ensure high hardness values, may be equal to at least 10% of a thickness T of radially inner ring 33 along axial length K1.

Moreover, if K defines an entire axial length of portion 37, the axial length of each of zone D1 and zone D2 may be equal to (K−K1)/2. In various embodiments, (K−K1)/2 may be greater than 2 mm.

Figure 5:
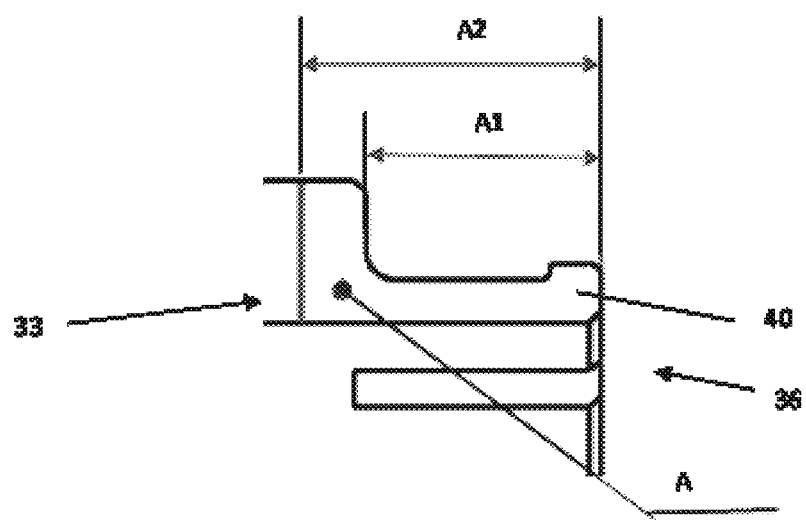
FIG. 5 shows a detail of the radially inner ring of FIG. 3 having an end portion that is not subjected to an induction-hardening heat treatment.

With reference to FIG. 5, end portion 36 may include a zone A as a minimum zone not to undergo induction-hardening heat treatment. In various embodiments, an axial length A1 of circular sector segments 40, an axial length A2 of zone A may be greater than A1+0.5 mm.

Finally and according to a preferred embodiment, a hardness of zones R, D1, D2, and A may be as shown in the table below:

| Zone | Hardness (HRC) | |
|---|---|---|
| | Min | Max |
| R | 56 | 64 |
| A | — | 45 |
| D1, D2 | 50 | 64 |

In various embodiments, zone R and zones D1 and D2, which may be subjected to an induction-hardening heat treatment, may reach a high hardness, each having a maximum hardness of up to 64 HRC. Zone R may have a minimum hardness of 56 HRC and D1, D2 may have a minimum hardness of 50 HRC. Zone A, which may not be subjected to an induction-hardening heat treatment, may have a maximum hardness of 45 HRC. Therefore, circular sector segments 40, which may be included in or overlap with zone A, may be made using a material that is pliable. Such material may have an optimum flexibility in response to a clamping action of concentric collar 20.

By exposing a portion of inner ring 33 to an induction-hardening heat treatment, the quality of the clamp between collar 20 and inner ring 33 is improved performance of the clamping system in terms of the power which can be transmitted and the vibration levels. The circular sector segments are more flexible and as a result, for the same tightening torque of the screws which act on the collar, the closing action of the circular sector segments may be increased.

In addition to exemplary embodiments described in this disclosure, it is to be understood that numerous additional variants exist. It must also be understood that these exemplary embodiments are only examples and do not limit either the scope of the disclosure, its applications, or its possible configurations. On the contrary, although descriptions provided above enables a person of ordinary skill in the art to implement the present disclosure consistent with at least one exemplary configuration, it must be understood that numerous variations of the components described are feasible, without thereby departing from the scope of the disclosure, as defined in the accompanying claims, interpreted literally and/or in accordance with their legal equivalents.

We claim:
1. A bearing unit comprising:
a stationary radially outer ring;
a radially inner ring comprising:
at least two circular sector segments formed at a first axial end portion of the inner ring, wherein the first axial end portion comprises a maximum hardness of 45 HRC; and a radially outer surface comprising:
- at least one raceway;
- an induction-hardened central zone coextensive with the at least one raceway, the central zone comprising a hardness of between 56 HRC and 64 HRC;
- an induction-hardened first peripheral zone and an induction-hardened second peripheral zone, each induction-hardened peripheral zone comprising a hardness of between 50 HRC and 64 HRC, wherein the induction-hardened first peripheral zone and the induction-hardened second peripheral zone are formed on opposite axial ends of the central zone, wherein the inner ring is configured to rotate around a central rotation axis (X) of the bearing unit; and a concentric collar configured to clamp the at least two circular sector segments to secure the radially inner ring on a rotating shaft.

2. The bearing unit of claim 1, wherein an axial length of the central zone is greater than or equal to an axial length of the at least one raceway of the radially inner ring.

3. The bearing unit of claim 2, wherein a hardening depth of the central zone over the axial length of central zone R is greater than or equal to 10% of a thickness of the radially inner ring.

4. The bearing unit of claim 1, wherein an axial length of each of the first peripheral zone and the second peripheral zone is greater than or equal to 2 mm.

5. The bearing unit of claim 1, wherein the first axial end portion comprises an axial length that is greater than an axial length of each of the at least two circular sector segments plus 0.5 mm.

* * * * *